United States Patent
Mosley et al.

(10) Patent No.: US 9,238,904 B2
(45) Date of Patent: Jan. 19, 2016

(54) IN-GROUND FLUSHING DEVICE

(71) Applicant: Mueller International, LLC, Atlanta, GA (US)

(72) Inventors: Harold Mosley, Ooltewah, TN (US); Wade Pope, Cleveland, TN (US)

(73) Assignee: Mueller International, LLC, Atlanta, GA (US)

( * ) Notice: Subject to any disclaimer, the term of this patent is extended or adjusted under 35 U.S.C. 154(b) by 231 days.

(21) Appl. No.: 13/971,282

(22) Filed: Aug. 20, 2013

(65) Prior Publication Data
US 2015/0053278 A1   Feb. 26, 2015

(51) Int. Cl.
*E03B 7/08* (2006.01)
*E03B 7/07* (2006.01)
*G01F 15/18* (2006.01)
*E03B 7/09* (2006.01)

(52) U.S. Cl.
CPC ...... *E03B 7/08* (2013.01); *E03B 7/07* (2013.01); *E03B 7/071* (2013.01); *E03B 7/072* (2013.01); *E03B 7/074* (2013.01); *E03B 7/075* (2013.01); *E03B 7/077* (2013.01); *E03B 7/078* (2013.01); *E03B 7/095* (2013.01); *G01F 15/18* (2013.01); *G01F 15/185* (2013.01); *Y10T 137/1353* (2015.04); *Y10T 137/6851* (2015.04)

(58) Field of Classification Search
CPC ........... E03B 7/07; E03B 7/071; E03B 7/072; E03B 7/074; E03B 7/075; E03B 7/077; E03B 7/078; E03B 7/08; G01F 15/18; G01F 15/185
See application file for complete search history.

(56) References Cited

U.S. PATENT DOCUMENTS

| | | | | |
|---|---|---|---|---|
| 1,969,432 | A | * | 8/1934 | Smith et al. ............. 137/315.06 |
| 2,576,630 | A | * | 11/1951 | Mueller et al. ................. 285/30 |
| 3,935,736 | A | * | 2/1976 | Enright ........................... 73/201 |
| 3,961,528 | A | * | 6/1976 | Ford .............................. 73/201 |
| 4,305,282 | A | * | 12/1981 | Hunt .............................. 73/201 |
| 5,145,214 | A | * | 9/1992 | Hunt ............................. 285/30 |
| 6,820,646 | B2 | * | 11/2004 | Helle ............................ 137/551 |
| 7,093,608 | B2 | * | 8/2006 | Taylor ............................ 137/59 |
| 8,020,575 | B1 | * | 9/2011 | Watson ..................... 137/15.16 |
| 2009/0277910 | A1 | * | 11/2009 | Buttz ........................... 220/484 |
| 2010/0200096 | A1 | * | 8/2010 | Cimberio et al. ............. 137/884 |

* cited by examiner

*Primary Examiner* — Kevin Murphy
(74) *Attorney, Agent, or Firm* — Taylor English Duma, LLP

(57) ABSTRACT

A flushing device includes an enclosure having an access opening; a discharge conduit; a fluid system conduit; a platform situated within the enclosure, the platform having a top surface and a bottom surface, the top surface facing the access opening and movable to proximate the access opening; a flushing valve mounted on the platform and in fluid communication with the fluid system conduit, the flushing valve operatively connected to a flushing controller, the flushing valve controllable by the flushing controller; and a meter mounted on the top surface of the platform, the meter including a meter inlet and a meter outlet, the meter inlet in fluid communication with the flushing valve, the flushing valve in fluid communication with the meter and the fluid system conduit, the meter outlet in fluid communication with the discharge conduit.

17 Claims, 12 Drawing Sheets

IN-GROUND FLUSHING DEVICE

TECHNICAL FIELD

This disclosure relates to flushing devices. More specifically, this disclosure relates to flushing devices for use in fluid distribution systems, such as automated potable water flushing devices for use in water distribution systems, within an enclosure having a movable platform.

BACKGROUND

Flushing devices may be used to flush water periodically from water systems. There are many reasons for flushing water systems, including water quality improvement, water age management and stagnation, contaminants, and disinfectants. Additionally, some water systems are in regions where freezing temperatures may be present on occasion during some or all of the calendar year.

SUMMARY

Disclosed is a flushing device including an enclosure having an inner surface and an outer surface, the inner surface and the outer surface defining an interior and an exterior of the enclosure, the inner surface and the outer surface further defining an access opening proximate an upper portion of the enclosure, the inner surface and the outer surface further defining a conduit outlet and a conduit inlet; a discharge conduit; a fluid system conduit, the fluid system conduit connectable with a fluid system; a platform situated within the enclosure, the platform having a top surface and a bottom surface, the top surface facing the access opening and movable to proximate the access opening; a flushing valve mounted on the platform and in fluid communication with the fluid system conduit, the flushing valve operatively connected to a flushing controller, the flushing valve controllable by the flushing controller; and a meter mounted on the top surface of the platform, the meter including a meter inlet and a meter outlet, the meter inlet in fluid communication with the flushing valve, the flushing valve in fluid communication with the meter and the fluid system conduit, the meter outlet in fluid communication with the discharge conduit.

Also disclosed is a flushing device including an enclosure having an inner surface and an outer surface, the inner surface and the outer surface defining an access opening proximate an upper portion of the enclosure; a platform within the enclosure, the platform having a top surface and a bottom surface, the top surface facing the access opening; a flushing valve mounted on the platform; and a U-shaped rigid fluid routing support pipe mounted on the platform and in fluid communication with the flushing valve, the U-shaped rigid fluid routing support pipe accessible from the access opening, the platform movable proximate to the access opening by interaction with the U-shaped rigid fluid routing support pipe.

Also disclosed is a flushing device including an enclosure having an inner surface and an outer surface, the inner surface and the outer surface defining an interior and an exterior of the enclosure, the inner surface and the outer surface further defining an access opening proximate an upper portion of the enclosure, the inner surface and the outer surface further defining a conduit outlet and a conduit inlet; a discharge conduit; a fluid system conduit, the fluid system conduit connectable with a fluid system; a platform situated within the enclosure, the platform having a top surface and a bottom surface, the top surface facing the access opening and movable to proximate the access opening; a flushing valve mounted on the platform, the flushing valve having a flushing valve inlet and a flushing valve outlet, the flushing valve inlet in fluid communication with the fluid system conduit, the flushing valve outlet in fluid communication with the discharge conduit; and a freeze control valve having a freeze valve inlet and a freeze valve outlet, the freeze valve inlet in fluid communication with the fluid system conduit, the freeze valve outlet in fluid communication with the discharge conduit, the freeze control valve openable under freezing conditions to allow fluid communication between the fluid system conduit and the discharge conduit.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures may be designated by matching reference characters for the sake of consistency and clarity.

DETAILED DESCRIPTION

Disclosed is a flushing device and associated methods, systems, devices, and various apparatus. The flushing device includes an enclosure, a platform, and a flushing valve. It would be understood by one of skill in the art that the disclosed flushing device is described in but a few exemplary embodiments among many. No particular terminology or description should be considered limiting on the disclosure or the scope of any claims issuing therefrom.

Figure 1:
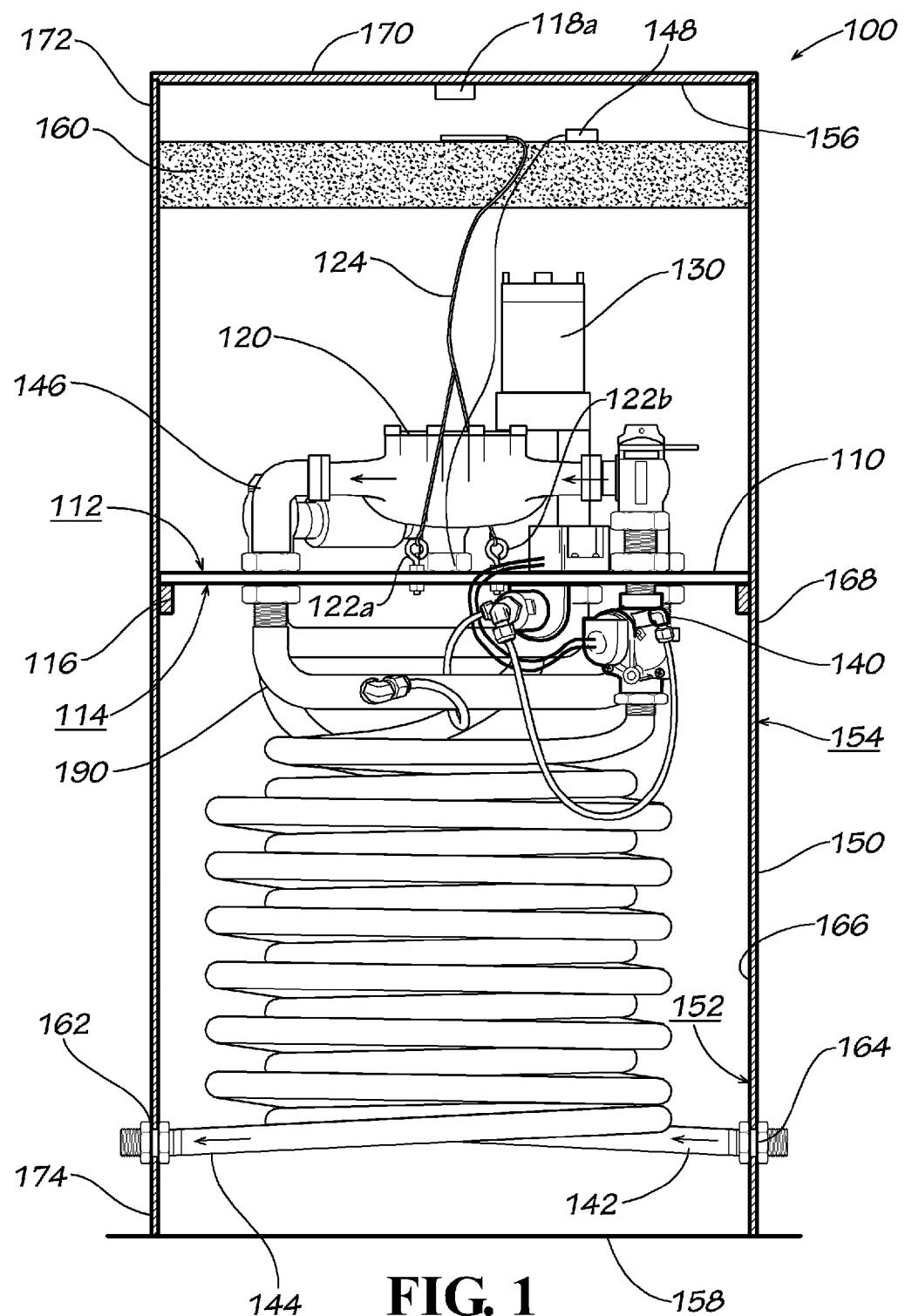
FIG. 1 is a side view of a flushing device in accordance with embodiments of the current disclosure with an enclosure, a top plate, and a platform of the flushing device shown in cross-section to show an interior of the enclosure, with the platform in a lowered position.

One embodiment of a flushing device 100 is disclosed and described in FIG. 1. The flushing device 100 includes an enclosure 150 having an inner surface 152 and an outer surface 154. The inner surface 152 and the outer surface 154 define an interior 166, an exterior 168, an access opening 156, and a lower opening 158. The access opening 156 is defined proximate an upper portion 172 of the enclosure 150 and the lower opening 158 is defined proximate a lower portion 174 of the enclosure 150. The inner surface 152 and the outer surface 154 also define a discharge outlet 162 and a fluid system inlet 164 proximate to the lower portion 174 in the current embodiment. The enclosure 150 may be formed out of a material with beneficial insulating properties. In the current embodiment, enclosure 150 is made of polyvinyl chloride (PVC). The lower opening 158 may be capped with a bottom cap (not shown) made of aluminum, PVC or other suitable material. The diameter of the enclosure 150 is typically between 21" and 30". In the current embodiment, the diameter of enclosure 150 is 21".

The flushing device 100 also includes a platform 110 situated within the enclosure 150. The platform 110 includes a top surface 112 and a bottom surface 114. The top surface 112 faces the access opening 156. In the current view, the platform 110 is shown in a lowered position resting on lower platform stop 116. In the current embodiment, the lower platform stop 116 is a rim around the interior 166 of the enclosure 150. The enclosure 150 also includes two upper platform stops 118a,b (118b shown in FIG. 2), though any number of upper platform stops 118 may be present in various embodiments. In the current embodiment, the upper platform stops 118a,b are stop blocks spaced opposite of each other on the interior 166 of the enclosure 150 proximate to the access opening 156. In the current embodiment, the platform 110 is movable and rotatable between the lowered position shown in FIG. 2 and a raised position shown in FIG. 3 wherein the platform 110 rests on the upper platform stops 118a,b. In some embodiments, the platform 110 may be raised and extended above enclosure 150 via the access opening 156. The depths of the flushing device 100 typically measure between 30" and 96" but may be shallower or deeper depending on the environment.

The enclosure 150 also includes a fluid system conduit 142 and a discharge conduit 144. In the current embodiment, the discharge conduit 144 provides a path for the water to exit the flushing device and extends from platform 110 to the discharge outlet 162 of the enclosure 150. In some embodiments, the discharge conduit 144 may extend from platform 110 through discharge outlet 162 to an external termination point. The fluid system conduit 142 provides a path for water to enter the flushing device and extends to the fluid system inlet 164. In some embodiments, the fluid system conduit 142 may extend from platform 110 through fluid system inlet 164 to an external termination point. In the current embodiment, the fluid system conduit 142 is connectable to a fluid system, and the discharge conduit 144 and the fluid system conduit 142 are reverse coiled one inside the other, with the fluid system conduit 142 coiled within the discharge conduit 144. In the current embodiment, the discharge conduit 144 and the fluid system conduit 142 are made of flexible 1" diameter thermal coils, allowing platform 110 to be raised and lowered while still connected to the termination points. The length of the thermal coil discharge conduit 144 and the fluid system conduit 142 are typically between 30" and 142". In the current embodiment, the length of the thermal coil discharge conduit 144 and the fluid system conduit 142 is 36".

Mounted on the platform 110 are a meter 120, a dechlorinator 130, and a flushing valve 140. The meter 120 and the dechlorinator 130 are mounted on the top surface 112 of the platform 110. The flushing valve 140 is mounted on the bottom surface 114 in the current embodiment, with the platform 110 between the flushing valve 140 and the access opening 156. A flushing controller 146 is also mounted to the top surface 112 and is wired to the flushing valve 140. An encoder receiver transmitter ("ERT") 148 is also wired to the flushing controller 146. The meter 120, the dechlorinator 130, and the flushing valve 140 are in fluid communication with each other and the discharge conduit 144 and the fluid system conduit 142. A pair of eyebolts 122a,b may be bolted into the platform 110 and connected to a lifting rope 124, which may be used to raise and lower the platform 110. In the current embodiment, the flushing valve 140 is a Storm Manufacturing Group Superior 950-100 valve, though the flushing valve 140 may be other models in various embodiments, and may be user defined. In the current embodiment, the meter 120 is a Mueller Systems/Hersey MVR Compact 160, though the meter 120 may be other models in various embodiments, and may be user defined.

The flushing device 100 also includes a foam pad 160 and a cover 170. The foam pad 160 fits within the enclosure 150 and serves as an insulator against freezing by trapping the relatively warm air rising from the earth, keeping the air around the meter above freezing. The foam pad 160 may be moved up and down within the enclosure 150 depending on the depth of the permafrost. The cover 170 covers the access opening 156. The cover 170 and the foam pad 160 are removable to permit access to the platform 110. One end of the lifting rope 124 may be placed on top of the foam pad 160 to allow easy access to the lifting rope 124. The ERT 148 may also be placed on top of the foam pad 160 to allow the ERT 148 to send and receive signals.

FIG. 1 also shows a first U-shaped rigid fluid routing support pipe 190 mounted on the platform 110 substantially below the platform 110 with a portion of the first U-shaped rigid fluid routing support pipe 190 extending through the platform 110. The first U-shaped rigid fluid routing support pipe 190 is used to route water throughout the system and to provide a secure and precise locations for connecting the various components, e.g. meter 120 and dechlorinator 130.

A second U-shaped rigid fluid routing support pipe 192 (shown in FIG. 7) is also mounted on the platform 110 substantially below the platform 110 with a portion of the second U-shaped rigid fluid routing support pipe 192 extending through the platform 110. The first U-shaped rigid fluid routing support pipe 190 connects the meter 120 to a backflow preventer 220 (shown in FIG. 2) mounted on the top surface 112, and the second U-shaped rigid fluid routing support pipe 192 connects the backflow preventer 220 to the dechlorinator 130. Additional U-shaped rigid fluid routing support pipes may be included if needed based upon component placement and water routing needs. The U-shaped rigid fluid routing support pipes provide an efficient method to route fluid throughout the device in such a small space while providing a rugged conduit.

Figure 2:
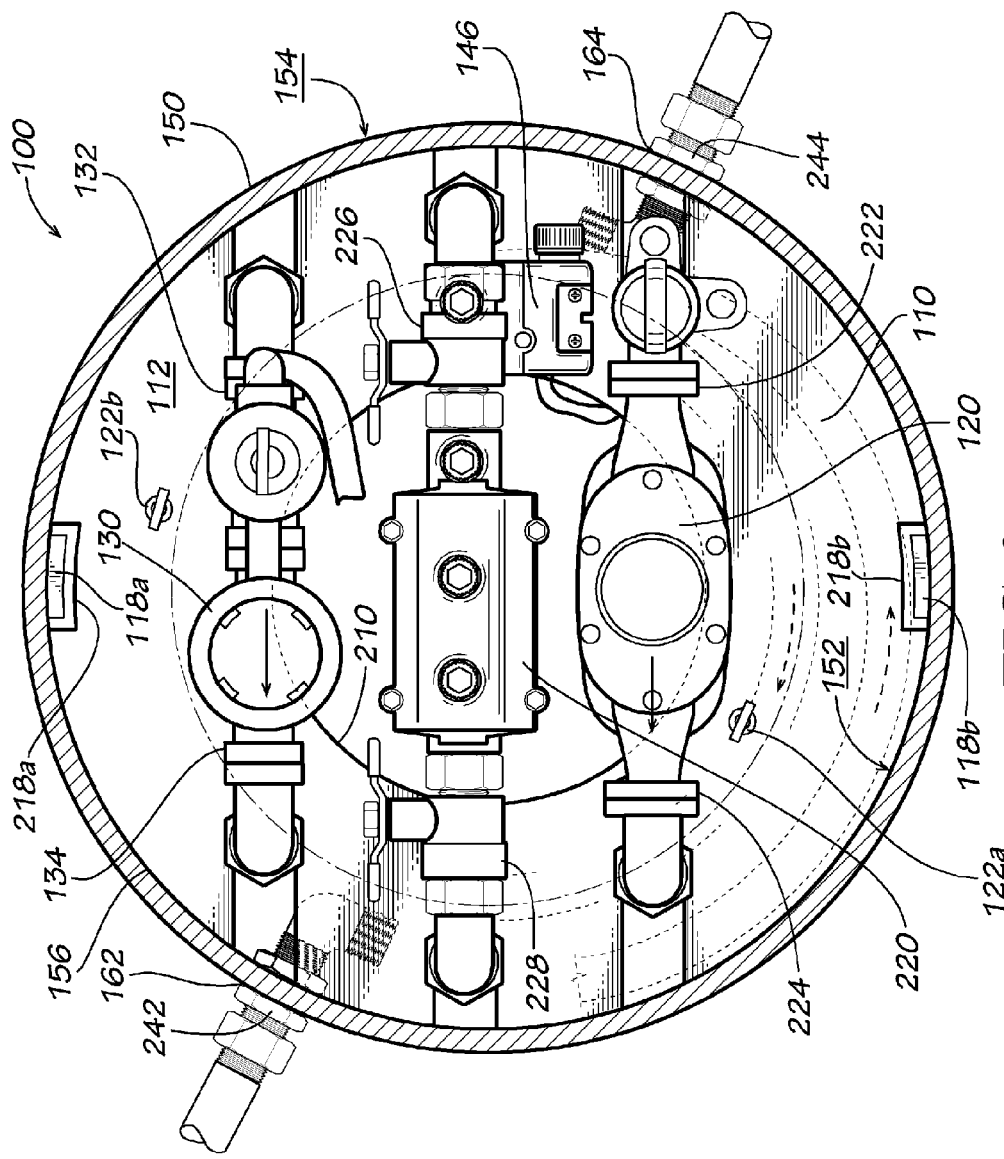
FIG. 2 is a top view of the flushing device of FIG. 1 with the top plate of the flushing device removed.

FIG. 2 shows a top view of the flushing device 100 with the cover 170 and the foam pad 160 removed. As shown in FIG. 2, the platform 110 includes two notches 218a,b spaced opposite of each other around the edge of the platform 110. The two notches 218a,b are sized to accept the two upper platform stops 118a,b. The platform 110 may be raised to allow the two upper platform stops 118a,b to pass through notches 218a,b, and the platform 110 may be thereafter rotated to allow the platform 110 to rest on two upper platform stops 118a,b in the raised position.

The platform 110 also includes an access hole 210 extending therethrough from the top surface 112 to the bottom surface 114. The access hole 210 allows access to the underside of the platform 110 between the platform 110 and the lower opening 158 from the access opening 156. The first U-shaped rigid fluid routing support pipe 190 and the second U-shaped rigid fluid routing support pipe 192 may be reached through the access hole 210, and the platform 110 may be raised by interaction with either or both of the first U-shaped rigid fluid routing support pipe 190 and the second U-shaped rigid fluid routing support pipe 192.

As shown in FIG. 2, the meter 120, the dechlorinator 130, and the backflow preventer 220 are arranged approximately parallel to each other in the current embodiment. The backflow preventer 220 is located between the meter 120 and the dechlorinator 130. The meter 120 include a meter inlet 222 and a meter outlet 224, the backflow preventer 220 includes a backflow preventer inlet 226 and a backflow preventer outlet 228, and the dechlorinator 130 includes a dechlorinator inlet 132 and a dechlorinator outlet 134. In the current embodiment, fluid flows from the fluid system into the fluid system conduit 142, through the flushing valve 140, into meter 120, through the first U-shaped rigid fluid routing support pipe 190, into backflow preventer 220, through the second U-shaped rigid fluid routing support pipe 192, into dechlorinator 130, and through discharge conduit 144.

Further, as shown in FIG. 2, in the current embodiment, a discharge conduit connector 242 is mounted in the discharge outlet 162 and a fluid system conduit connector 244 is mounted in the fluid system inlet 164. The discharge conduit connector 242 connects to the discharge conduit 144 and may also be connected to a discharge system. The fluid system conduit connector 244 connects to the fluid system conduit 142 and may also be connected to the fluid system. The fluid system may be a municipal water system or any other system where it may be desirable to flush fluids periodically, such as to remove stagnant water from the system. The discharge system may be a sewer, well, reservoir, body of water, or any other system where fluid may be flushed.

Figure 3:
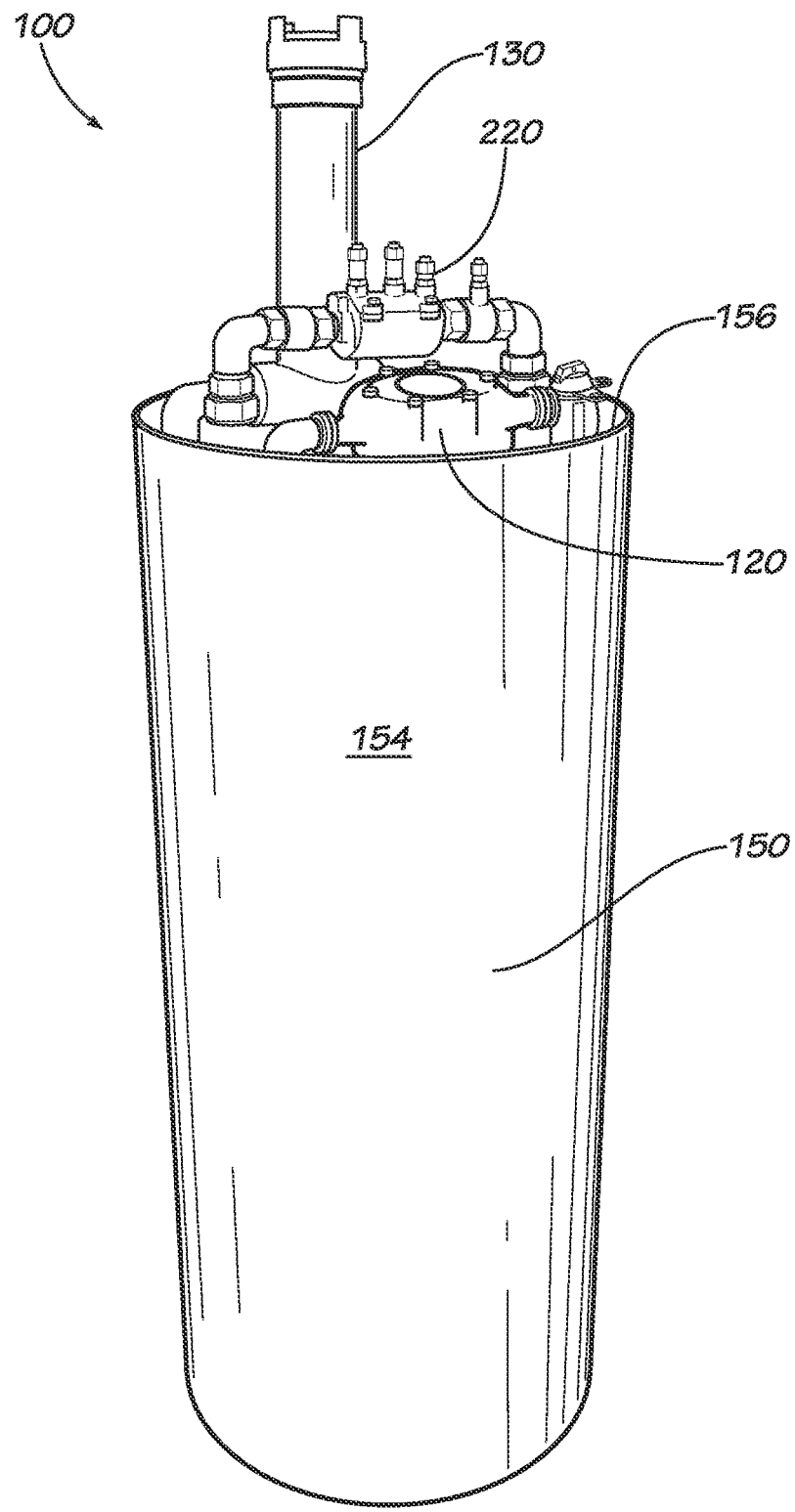
FIG. 3 is a perspective view of the flushing device of FIG. 1 with the top plate of the flushing device removed and with the platform of the flushing device in a raised position.

FIG. 3 shows a perspective view of the flushing device 100 with the cover 170 and the foam pad 160 removed and with the platform 110 in the raised position. As shown in FIG. 3, when the platform 110 is in the raised position, the meter 120, the backflow preventer 220, and the dechlorinator 130 are raised above the access opening 156. When the flushing device 100 is placed in a pit, bringing the platform 110 to the raised position brings the meter 120, the backflow preventer 220, and the dechlorinator 130 to ground level to access these components and enables easier maintenance of the flushing device.

Figure 4:
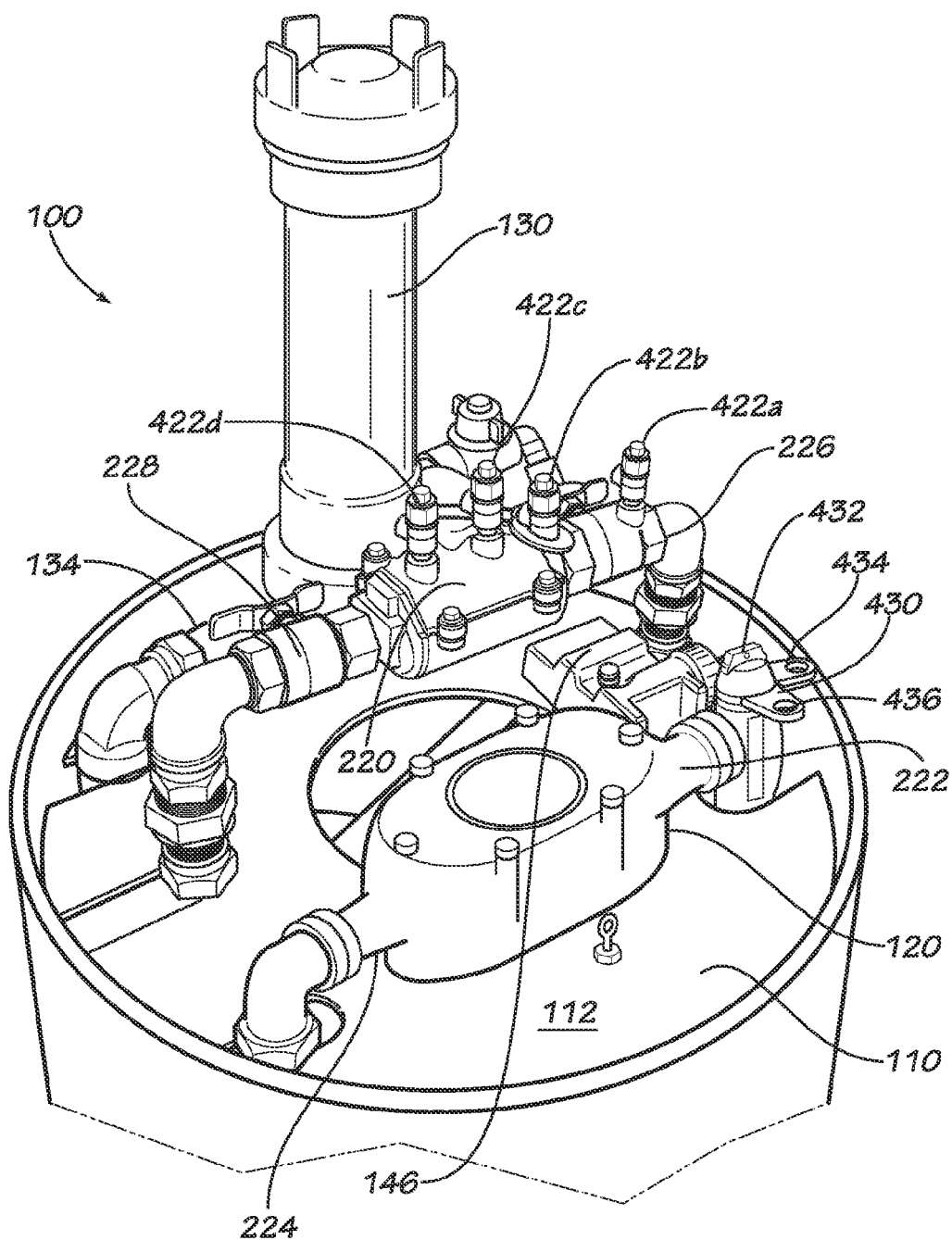
FIG. 4 is a second perspective view of the flushing device of FIG. 1 with the top plate of the flushing device removed and with the platform of the flushing device in a raised position.

FIG. 4 shows a perspective detail view of the platform 110 in the raised position. As shown in FIG. 4, the backflow preventer 220 includes four relief valves 422a,b,c,d. The four relief valve 422a,b,c,d are spaced along the backflow preventer 220 to relieve air buildup within various sections of the backflow preventer 220. In the current embodiment, the backflow preventer 220 is a double check valve, though other backflow preventers 220 may be present in various embodiments. In the current embodiment, the double check valve is a Wilkins-Zurn 350XL-1, though the backflow preventer 220 may be other models in various embodiments, and may be user defined.

Also shown in FIG. 4 is a lock valve 430 connected to the meter inlet 222. The lock valve 430 is a ball valve in the current embodiment and includes a rotatable locking cap 432. The locking cap 432 includes an upper locking tab 434, and the locking valve 430 also includes a lower locking tab 436. The locking cap 432 may be rotated to align the upper locking tab 434 with the lower locking tab 436, closing the valve and preventing fluid from entering the meter 120. A lock may thereafter be inserted through the upper locking tab 434 and the lower locking tab 436, locking the flushing device 100 closed. Removing the lock and rotating the locking cap 432 so that the upper locking tab 434 is turned ninety degrees from the lower locking tab 436 opens the lock valve 430, allowing fluid flow through the lock valve 430 to the meter 120. In the current embodiment, the lock valve 430 is a Mueller Co. Mueller angle dual check valve, though the lock valve 430 may be other models in various embodiments, and may be user defined.

Figure 5:
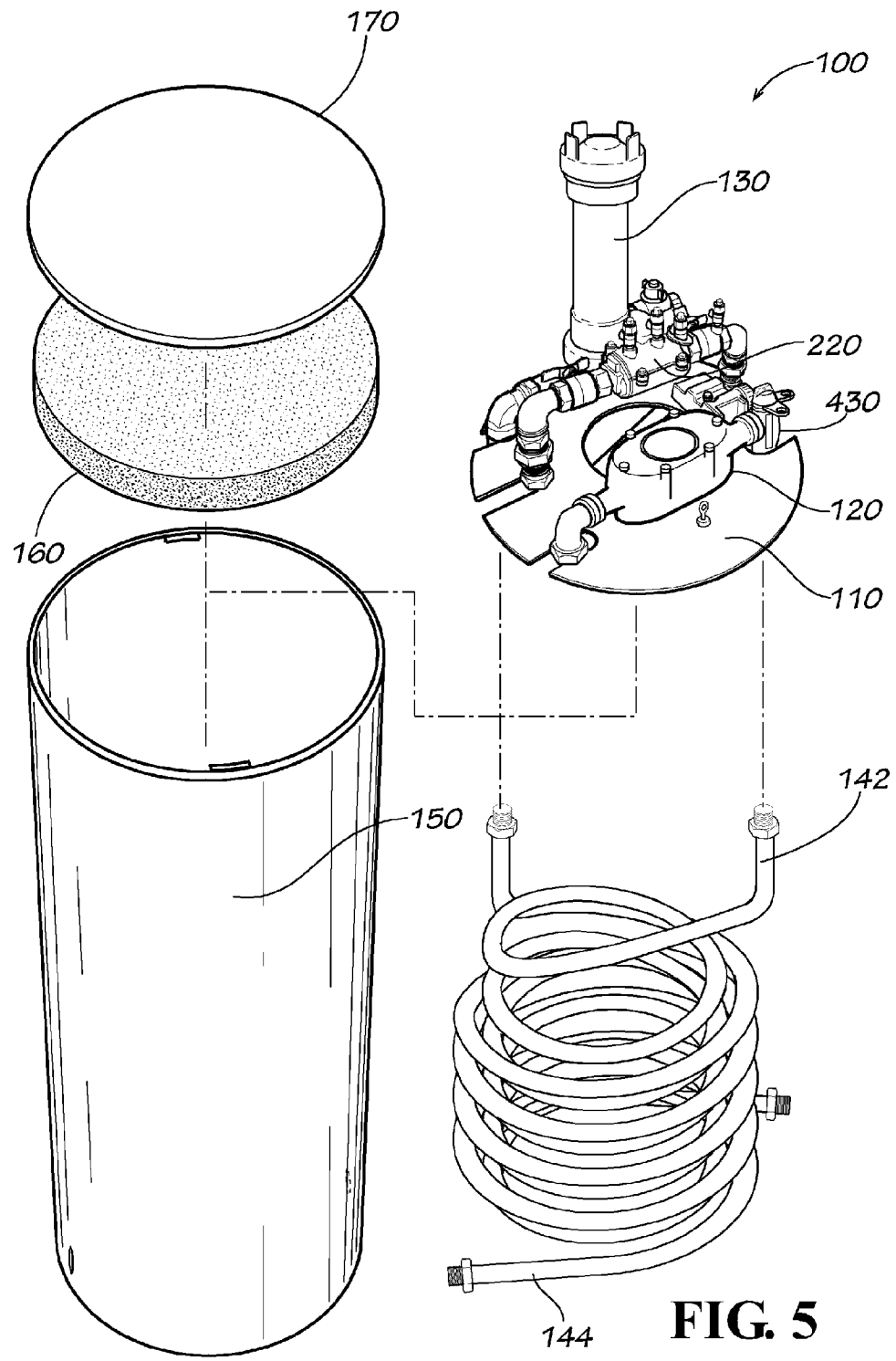
FIG. 5 is a perspective exploded view of the flushing device of FIG. 1.
Figure 6:
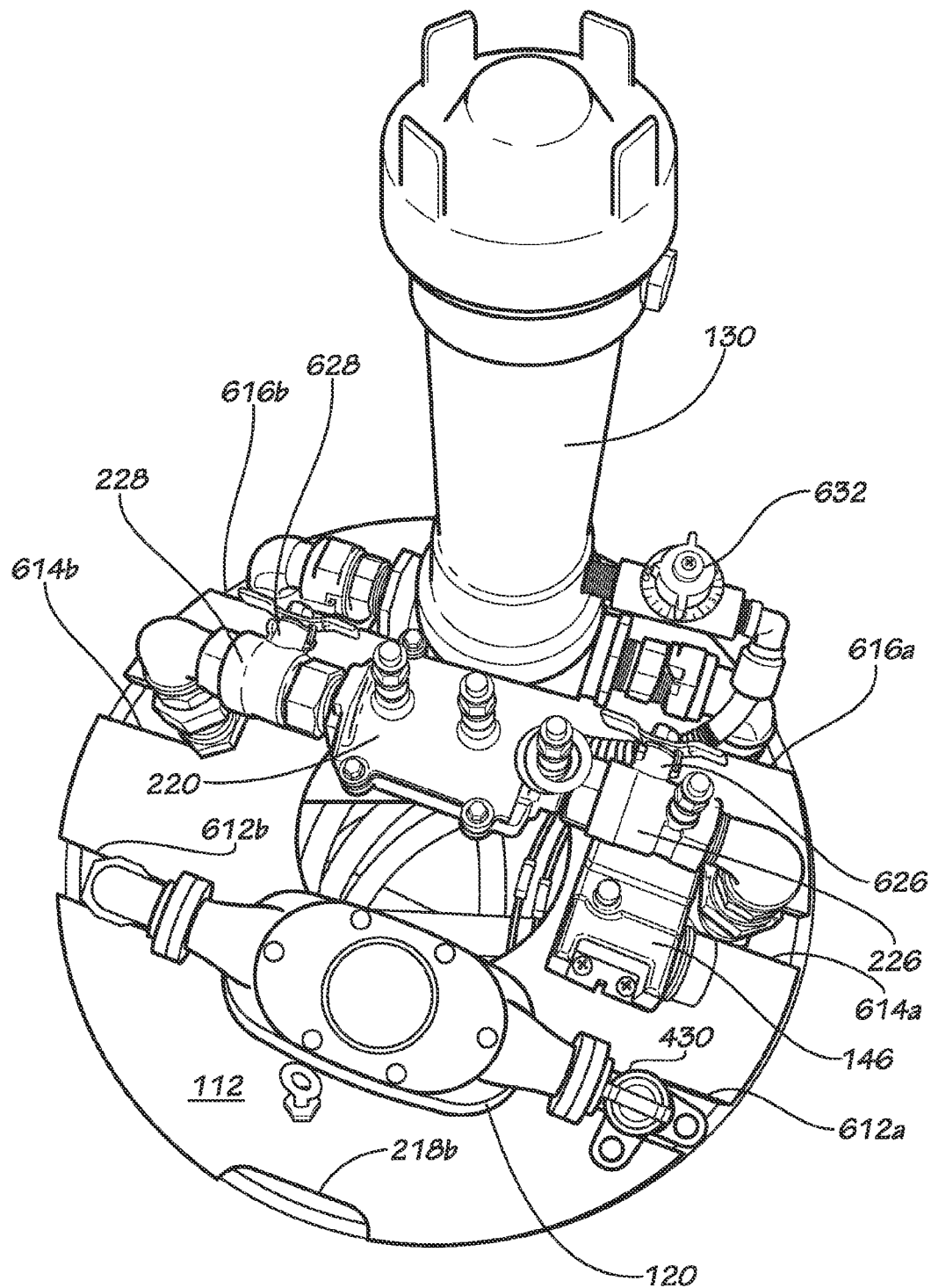
FIG. 6 is a perspective view of the flushing device of FIG. 1 with the platform in a lowered position.

FIG. 5 shows an exploded perspective view of the flushing device 100. FIG. 6 shows a perspective view of the platform 110. As shown in FIG. 6, the backflow preventer 220 also includes an inlet manual shutoff valve 626 proximate to the backflow preventer inlet 226 and an outlet manual shutoff valve 628 proximate to the backflow preventer outlet 228 in the current embodiment. Also as shown in FIG. 6, the dechlorinator 130 includes a dechlorinator control valve 632 that may be adjusted to control the rate of dechlorination. In the current embodiment, the dechlorinator 130 is a standard pool chlorinator Pentair Water Rainbow Model #320 with dechlorination tablets used instead of chlorinaton tablets, though other dechlorinators 130 may be present in various embodiments, and may be user defined. In the current embodiment, fluid is passed over the dechlorination tablets within the dechlorinator 130 to dechlorinate the fluid. Also as shown in FIG. 6, the flushing controller 146 may be screwed to the top surface 112.

Also shown in FIG. 6 are meter connection cutouts 612a,b, backflow preventer connection cutouts 614a,b, and dechlorinator connection cutouts 616a,b defined in the platform 110. The meter connection cutouts 612a,b allow connection of the meter 120 with the flushing valve 140 and the first U-shaped rigid fluid routing support pipe 190, respectively, through the platform 110. The backflow preventer connection cutouts 614a,b allow connection of the backflow preventer 220 with the first U-shaped rigid fluid routing support pipe 190 and the second U-shaped rigid fluid routing support pipe 192, respectively, through the platform 110. The dechlorinator connection cutouts 616a,b allow connection of the dechlorinator 130 with the second U-shaped rigid fluid routing support pipe 192 and the discharge conduit 144, respectively, through the platform 110. The meter connection cutouts 612a,b, backflow preventer connection cutouts 614a,b, and dechlorinator connection cutouts 616a,b are sized to allow the connections between the components to be tightened against the top surface 112 and the bottom surface 114 of the platform 110 or to the U-shaped rigid fluid routing support pipes 190,192, as applicable, to mount the components.

Figure 7:
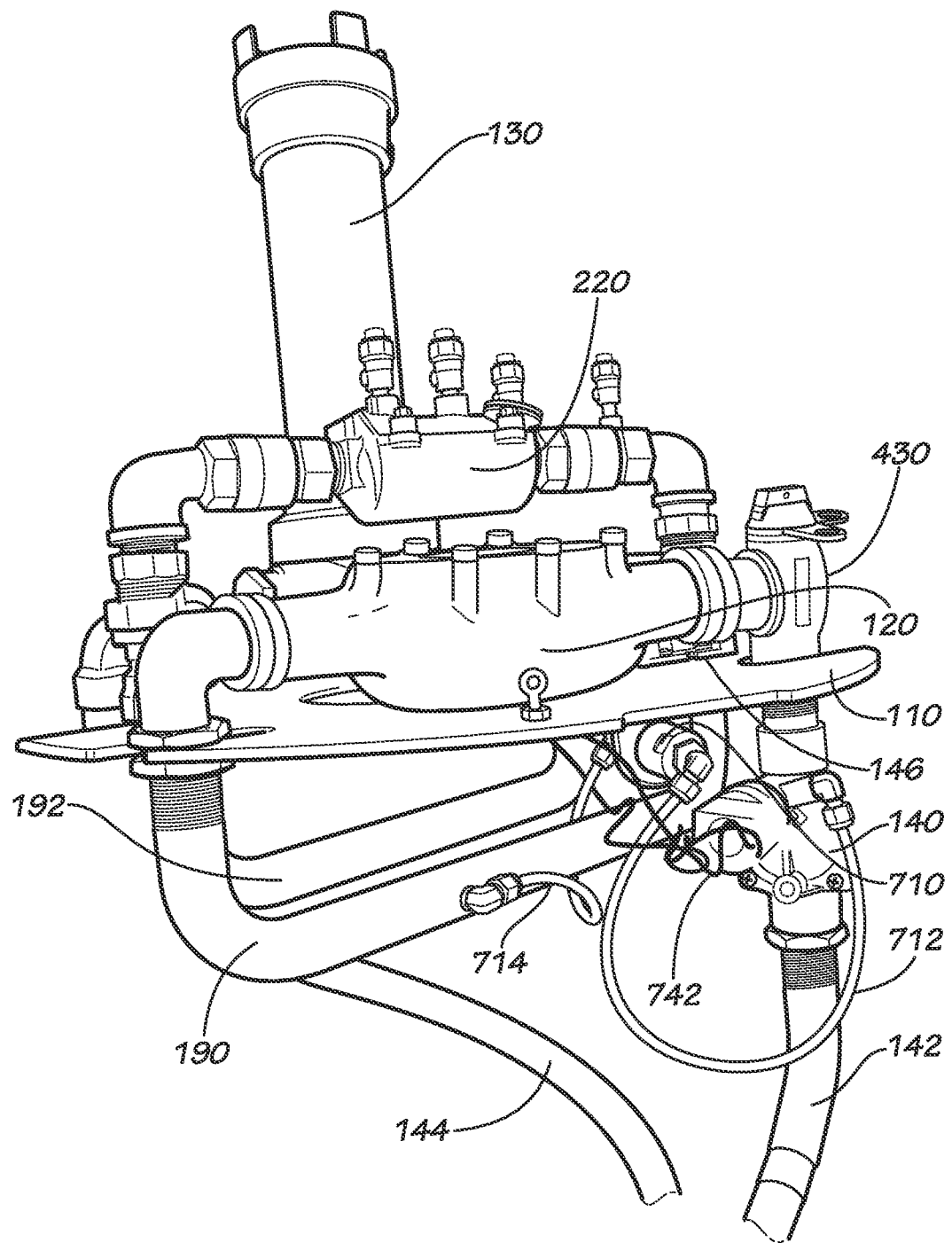
FIG. 7 is a perspective view of the platform of the flushing device of FIG. 1.
Figure 8:
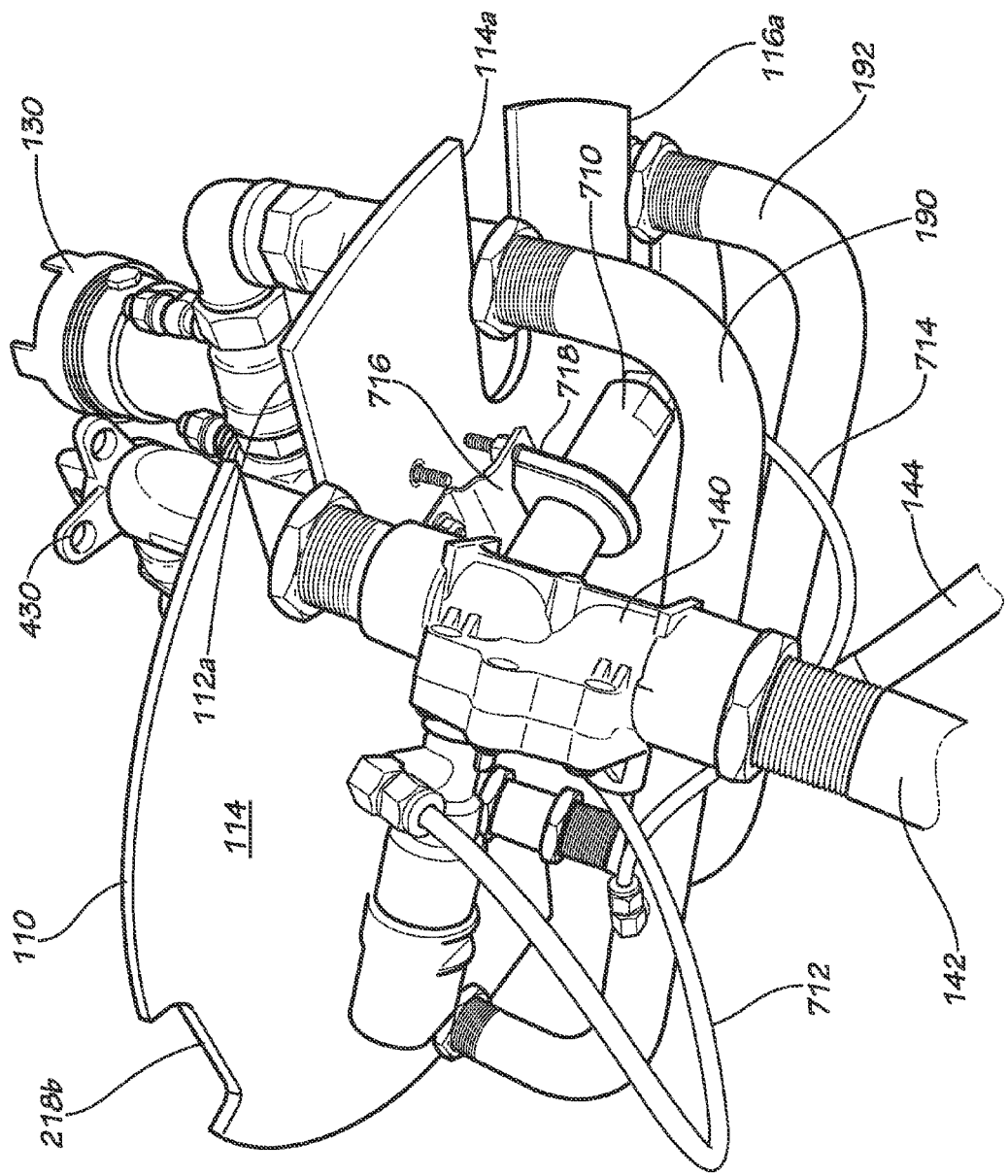
FIG. 8 is a second perspective view of the platform of the flushing device of FIG. 1.
Figure 9:
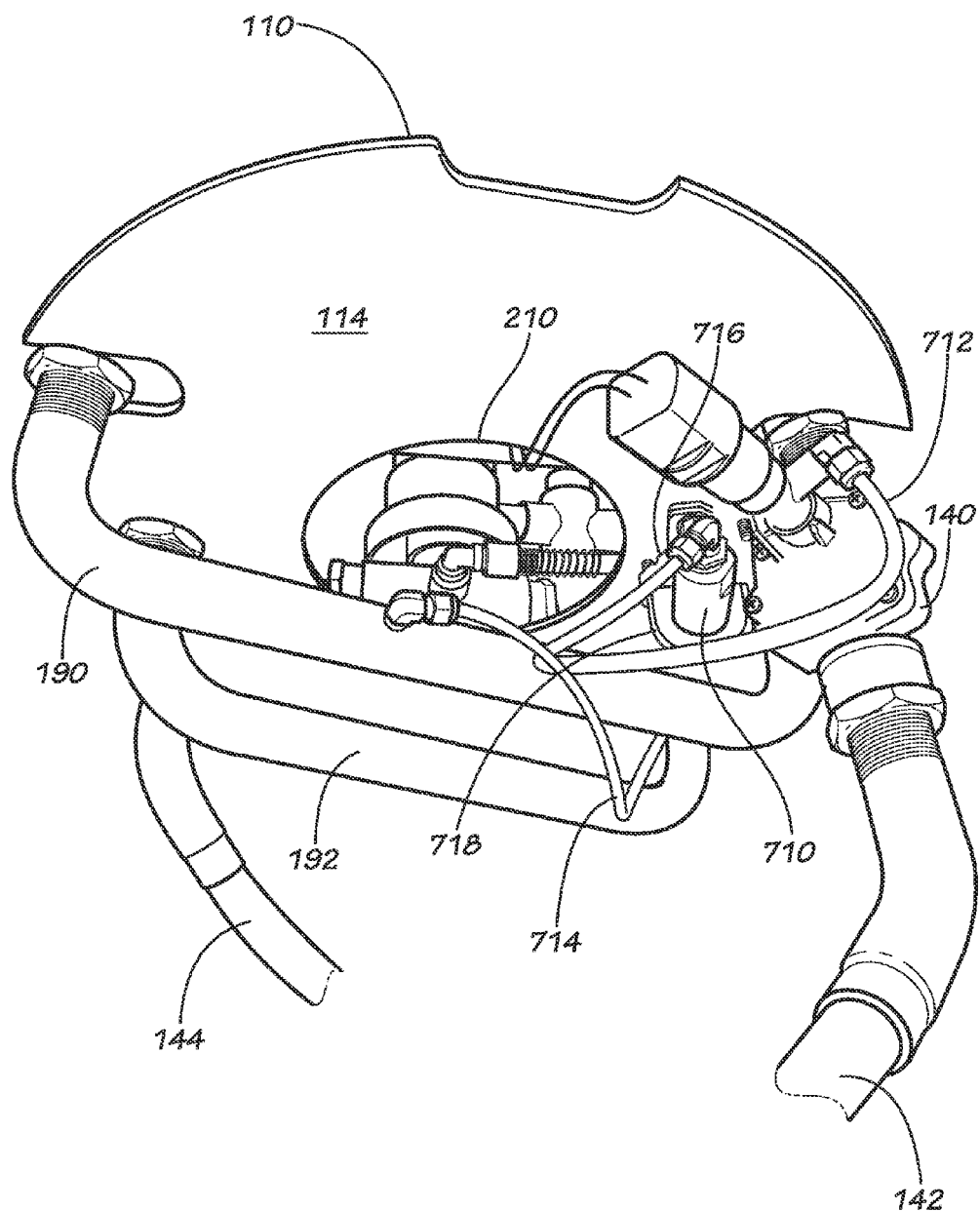
FIG. 9 is a third perspective view of the platform of the flushing device of FIG. 1.

FIGS. 7-11 show various perspective views of the platform 110. As shown in FIG. 7, the flushing valve 140 is connected to the flushing controller 146 by wiring 742 running through the access hole 210 of the platform 110. The flushing controller 146 thereby communicates with the flushing valve 140 to open and close the flushing valve 140. Additionally, the flushing controller 146 may adjust the flow of fluid through the flushing valve 140 to less than maximum flow (open) and greater than minimum flow (e.g. closed). The flushing controller 146 may be programmed to periodically open and close the flushing valve 140. In the current embodiment, the flushing controller 146 may open the flushing valve 140 for one to 960 minutes eight times a day.

Shown in FIGS. 7-10 is a freeze control valve 710 mounted on the bottom surface 114 of the platform 110 by a mounting bracket 716 and a U-bolt 718, though the freeze control valve 710 may be mounted to the platform 110 in various locations by various methods in various embodiments. Inlet tubing 712 of the freeze control valve 710 connects the freeze control valve 710 to the flushing valve and thereby is in fluid communication with the fluid system conduit 142. Outlet tubing 714 of the freeze control valve 710 connects the freeze control valve 710 to the first U-shaped rigid fluid routing support pipe 190 and thereby is in fluid communication with the discharge conduit 144. In various embodiments, the inlet tubing 712 and the outlet tubing 714 may be connected in various locations to place the freeze control valve 710 in fluid communication with the fluid system conduit 142 and the discharge conduit 144, respectively.

In the current embodiment, the freeze control valve 710 contains a temperature sensing device. The temperature sensing device detects the temperature of the fluid within the flushing device 100, measuring for freezing conditions, and triggers the freeze control valve 710 to open under predetermined temperatures, such as freezing condition temperatures, to prevent freezing of the fluid within the flushing device 100. For example, freezing condition temperatures may be any temperature 40 degrees Fahrenheit and colder. When the freeze control valve 710 opens, the fluid bypasses the flushing valve 140 to allow fluid to flow from the fluid system conduit 142 to the discharge conduit 144. When the temperature sensing device detects that the fluid within the freeze control valve 710 is no longer within the range of the predetermined temperatures, the freeze control valve 710 closes. In various embodiments, the freeze control valve 710 may open to varying degrees depending on the severity of the freezing conditions, allowing a small trickle of fluid to flow under mild freezing conditions and high flow for severe freezing conditions, for example. For example, when the temperature reduces to 40 degrees Fahrenheit, the freeze control valve 710 may open and allow a small amount of water to flow. When the temperature reduces to 35 degrees Fahrenheit, the freeze control valve 710 may open fully to allow the maximum amount of fluid to flow. In the current embodiment, the freeze control valve 710 is a Therm-Omega-Tech, Inc. FP-100, though the freeze control valve 710 may be other models in various embodiments, and may be user defined.

Figure 10:
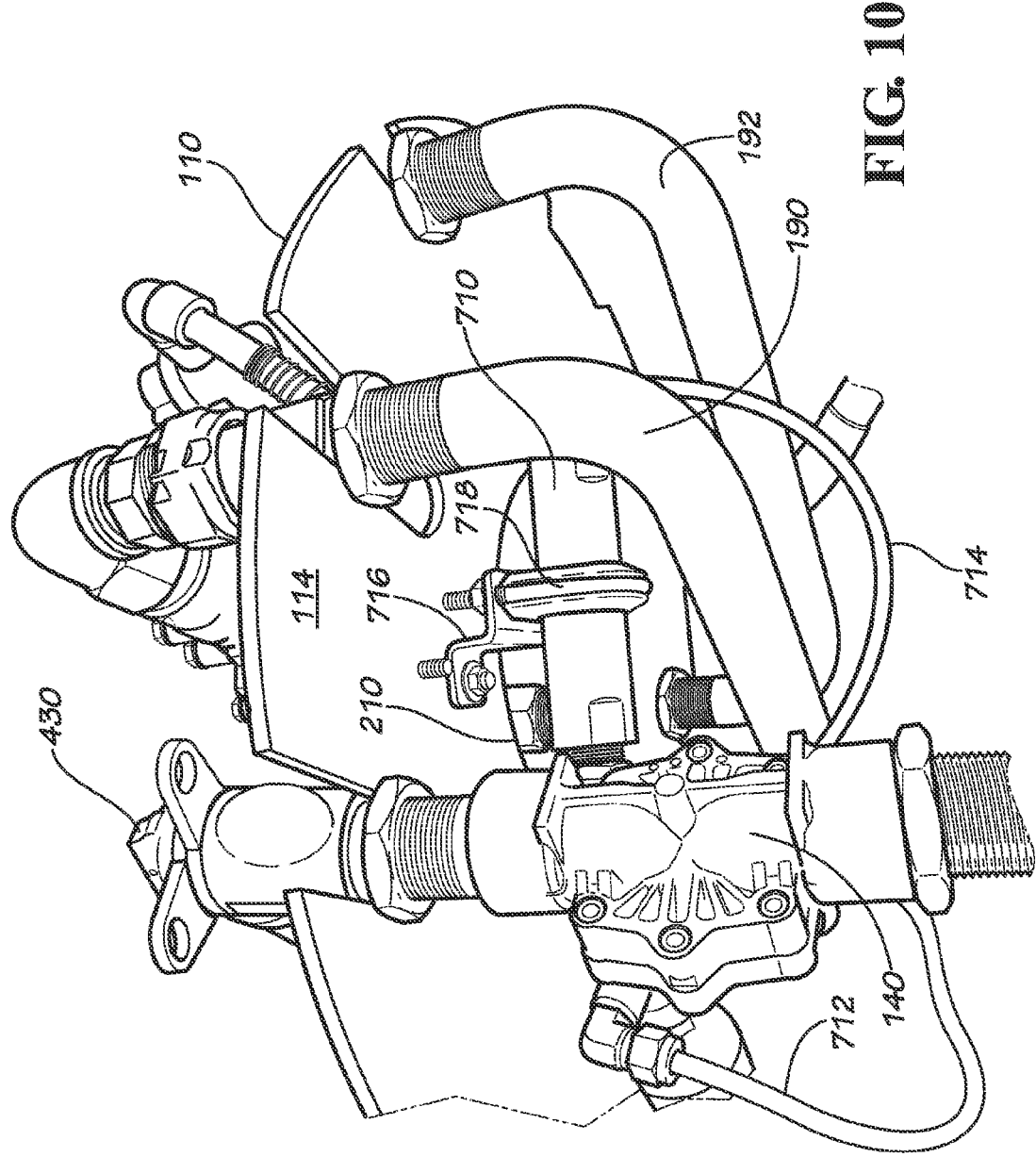
FIG. 10 is a fourth perspective view of the platform of the flushing device of FIG. 1.
Figure 11:
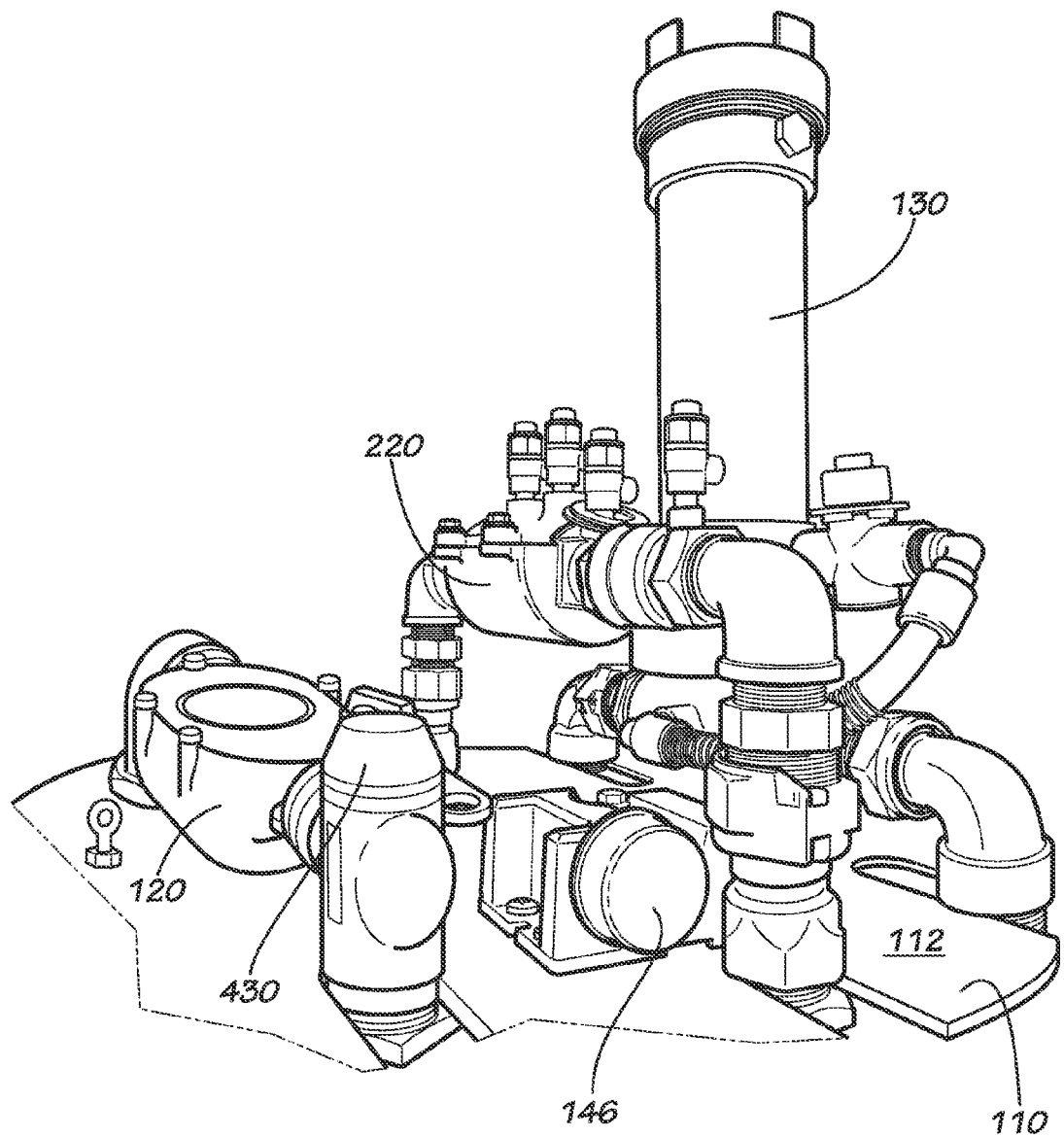
FIG. 11 is a fifth perspective view of the platform of the flushing device of FIG. 1.

FIG. 10 shows that the first U-shaped rigid fluid routing support pipe 190 and the second U-shaped rigid fluid routing support pipe 192 are accessible through the access hole 210 of the platform 110. By reaching through the access hole 210, by hand or by other instruments, such as with a hook, one or both of the first U-shaped rigid fluid routing support pipe 190 and the second U-shaped rigid fluid routing support pipe 192 may be raised or lowered to thereby raise or lower the platform 110. The first U-shaped rigid fluid routing support pipe 190 and the second U-shaped rigid fluid routing support pipe 192 are capable of supporting the platform 110 and all the components of the flushing device 100 mounted thereon, including the meter 120, the backflow preventer 220, and the dechlorinator 130. If the platform 110 were to be removed from the enclosure 150 the first U-shaped rigid fluid routing support pipe 190 and the second U-shaped rigid fluid routing support pipe 192 may also bear the weight of the platform 110 and the components of the flushing device 100 mounted thereon when the first U-shaped rigid fluid routing support pipe 190 and the second U-shaped rigid fluid routing support pipe 192 are placed on a resting surface, such as the ground adjacent to the enclosure 150.

Figure 12:
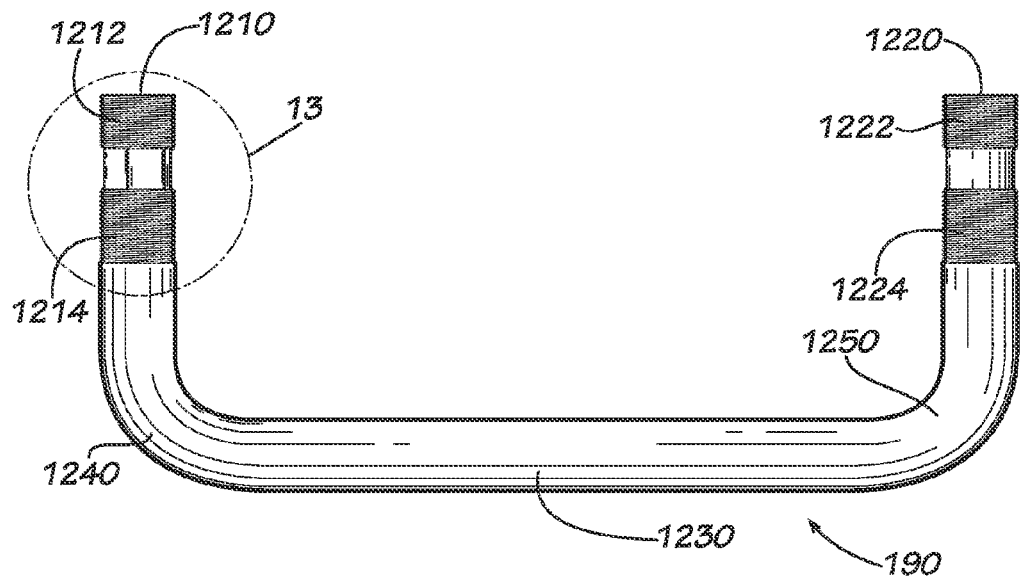
FIG. 12 is a side view of a U-shaped rigid fluid routing support pipe of a flushing device in accordance with embodiments of the current disclosure.

FIG. 12 shows a side view of the first U-shaped rigid fluid routing support pipe 190. In the current embodiment, the second U-shaped rigid fluid routing support pipe 192 is substantially similar to the first U-shaped rigid fluid routing support pipe 190, though the second U-shaped rigid fluid routing support pipe 192 may not be similar to the first U-shaped rigid fluid routing support pipe 190 in various embodiments. The first U-shaped rigid fluid routing support pipe 190 includes a first end 1210, a second end 1220, a lateral portion 1230, a first bend 1240, and a second bend 1250. The first bend 1240 connects the first end 1210 to the lateral portion 1230, and the second bend 1250 connects the second end 1220 to the lateral portion 1230. The first end 1210 includes upper threads 1212 and lower threads 1214, and second end 1220 includes upper threads 1222 and lower threads 1224. The lower threads 1214,1224 are below platform 110 when the first U-shaped rigid fluid routing support pipe 190 is mounted to the platform 110 and are used to secure the first U-shaped rigid fluid routing support pipe 190 to platform 110. The upper threads 1212,1222 are located on the portion of the first U-shaped rigid fluid routing support pipe 190 extending through the platform 110 and provide a connection point for the various components. In addition to providing a secure connection for various components, the first U-shaped rigid fluid routing support pipe 190 enables precise location of the components. The meter connection cutouts 612a,b, backflow preventer connection cutouts 614a,b, and dechlorinator connection cutouts 616a,b are all sized to accept the first end 1210 or the second end 1220 of the first U-shaped rigid fluid routing support pipe 190, or corresponding ends of the second U-shaped rigid fluid routing support pipe 192.

Figure 13:
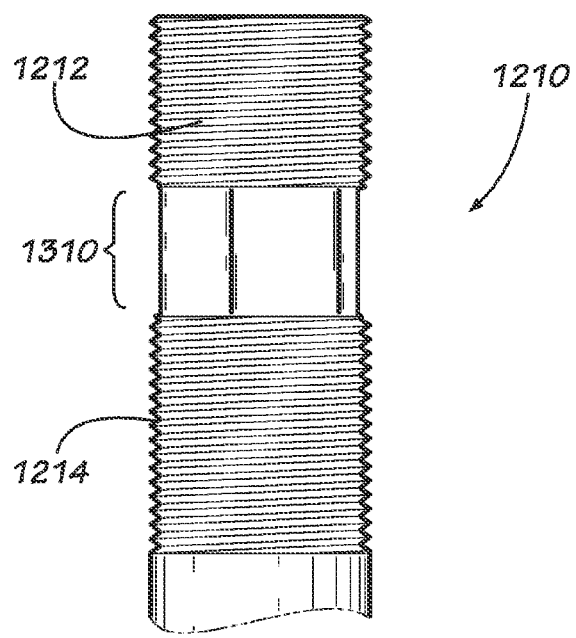
FIG. 13 is a detail side view of an end of the U-shaped rigid fluid routing support pipe of FIG. 12 taken from detail 13 shown in FIG. 12.

FIG. 13 shows a detail view of the first end 1210. As shown in FIG. 13, the first end 1210 includes a crimped portion 1310. The crimped portion 1310 includes a hexagonal cross-section, creating six flat surfaces around the periphery of crimped portion 1310, though various cross-sections may be used in various embodiments. The crimped portion 1310 gives the first U-shaped rigid fluid routing support pipe 190 a grippable portion that may be secured with a gripping mechanism such as pliers to firmly hold the first U-shaped rigid fluid routing support pipe 190 in place during installation of the first U-shaped rigid fluid routing support pipe 190 on the platform 110.

One should note that conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more particular embodiments or that one or more particular embodiments necessarily include logic for deciding, with or without user input or prompting, whether these features, elements and/or steps are included or are to be performed in any particular embodiment.

It should be emphasized that the above-described embodiments are merely possible examples of implementations, merely set forth for a clear understanding of the principles of the present disclosure. Any process descriptions or blocks in flow diagrams should be understood as representing modules, segments, or portions of code which include one or more executable instructions for implementing specific logical functions or steps in the process, and alternate implementations are included in which functions may not be included or executed at all, may be executed out of order from that shown or discussed, including substantially concurrently or in reverse order, depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and subcombinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A flushing device comprising:
    an enclosure having an inner surface and an outer surface, the inner surface and the outer surface defining an interior and an exterior of the enclosure, the inner surface and the outer surface further defining an access opening proximate an upper portion of the enclosure, the inner surface and the outer surface further defining a conduit outlet and a conduit inlet;
    a discharge conduit;
    a fluid system conduit extending through the conduit inlet from the interior of the enclosure to the exterior of the enclosure, the fluid system conduit connectable with a fluid system;
    a platform situated within the enclosure, the platform having a top surface and a bottom surface, the top surface facing the access opening and movable to proximate the access opening;
    a U-shaped rigid fluid routing support pipe mounted to the platform and disposed substantially below the platform, the U-shaped rigid fluid routing support pipe in fluid communication with the discharge conduit, a portion of the U-shaped rigid fluid routing support pipe extending through the platform;
    a flushing valve mounted on the platform and in fluid communication with the fluid system conduit, the flushing valve operatively connected to a flushing controller, the flushing valve controllable by the flushing controller; and
    a meter mounted on the top surface of the platform, the meter including a meter inlet and a meter outlet, the meter inlet in fluid communication with the flushing valve, the flushing valve in fluid communication with the meter and the fluid system conduit, the meter outlet in fluid communication with the discharge conduit.

2. The flushing device of claim 1, further comprising:
    a backflow preventer mounted on the top surface of the platform, an inlet of the backflow preventer in fluid communication with the fluid system and an outlet of backflow preventer in fluid communication with the discharge conduit; and
    a dechlorinator mounted on the top surface of the platform, the dechlorinator in fluid communication with the discharge conduit.

3. The flushing device of claim 1, wherein the flushing controller is programmable and controllable.

4. The flushing device of claim 1, further comprising a freeze control valve mounted on the platform and in fluid communication with the discharge conduit and the fluid system conduit, the freeze control valve openable under freezing conditions to allow fluid communication between the fluid system conduit and the discharge conduit.

5. The flushing device of claim 1, further comprising a plurality of U-shaped rigid fluid routing support pipes mounted on the platform, wherein at least one of the meter, the flushing valve, a dechlorinator, a backflow preventer, and a freeze control valve is connected to an end of the portion of at least one of the plurality of U-shaped rigid fluid routing support pipes extending through the platform.

6. The flushing device of claim 1, wherein:
    the enclosure includes an upper platform stop proximate the access opening;
    the platform includes a notch;
    the notch is sized to accept the upper platform stop; and
    the platform is rotatable to stop the platform against the upper platform stop proximate the access opening.

7. A flushing device comprising:
    an enclosure having an inner surface and an outer surface, the inner surface and the outer surface defining an access opening proximate an upper portion of the enclosure;
    a platform within the enclosure, the platform having a top surface and a bottom surface, the top surface facing the access opening;
    a flushing valve mounted on the platform; and
    a U-shaped rigid fluid routing support pipe mounted on the platform and disposed substantially below the platform, the U-shaped rigid fluid routing support pipe in fluid communication with the flushing valve, a portion of the U-shaped rigid fluid routing support pipe extending through the platform, the U-shaped rigid fluid routing support pipe accessible from the access opening, the platform movable proximate to the access opening by interaction with the U-shaped rigid fluid routing support pipe.

8. The flushing device of claim 7, wherein the platform defines an access hole through the platform, the access hole providing access to the U-shaped rigid fluid routing support pipe from the access opening.

9. The flushing device of claim 7, further comprising a plurality of U-shaped rigid fluid routing support pipes mounted on the platform and in fluid communication with the flushing valve, the plurality of U-shaped rigid fluid routing support pipes accessible from the access opening, the platform movable proximate to the access opening by interaction with at least one of the U-shaped rigid fluid routing support pipes.

10. The flushing device of claim 7, further comprising:
    a meter mounted on the top surface of the platform;
    a backflow preventer mounted on the top surface of the platform; and
    a dechlorinator mounted on the top surface of the platform.

11. The flushing device of claim 10, wherein the U-shaped rigid fluid routing support pipe connects the meter to the backflow preventer.

12. The flushing device of claim 10, wherein the U-shaped rigid fluid routing support pipe connects the backflow preventer to the dechlorinator.

13. A flushing device comprising:
    an enclosure having an inner surface and an outer surface, the inner surface and the outer surface defining an interior and an exterior of the enclosure, the inner surface and the outer surface further defining an access opening proximate an upper portion of the enclosure, the inner surface and the outer surface further defining a conduit outlet and a conduit inlet;
    a discharge conduit;

a fluid system conduit extending through the conduit inlet from the interior of the enclosure to the exterior of the enclosure, the fluid system conduit connectable with a fluid system;

a platform situated within the enclosure, the platform having a top surface and a bottom surface, the top surface facing the access opening and movable to proximate the access opening;

a plurality of U-shaped rigid fluid routing support pipes mounted on the platform;

a flushing valve mounted on the platform and in fluid communication with the fluid system conduit, the flushing valve operatively connected to a flushing controller, the flushing valve controllable by the flushing controller; and a meter mounted on the top surface of the platform, the meter including a meter inlet and a meter outlet, the meter inlet in fluid communication with the flushing valve, the flushing valve in fluid communication with the meter and the fluid system conduit, the meter outlet in fluid communication with the discharge conduit;

wherein at least one of the meter, the flushing valve, a dechlorinator, a backflow preventer, and a freeze control valve is connected to an end of the portion of at least one of the plurality of U-shaped rigid fluid routing support pipes extending through the platform.

14. A flushing device comprising:

an enclosure having an inner surface and an outer surface, the inner surface and the outer surface defining an interior and an exterior of the enclosure, the inner surface and the outer surface further defining an access opening proximate an upper portion of the enclosure, the inner surface and the outer surface further defining a conduit outlet and a conduit inlet, the enclosure including an upper platform stop proximate the access opening;

a discharge conduit;

a fluid system conduit extending through the conduit inlet from the interior of the enclosure to the exterior of the enclosure, the fluid system conduit connectable with a fluid system;

a platform situated within the enclosure, the platform having a top surface and a bottom surface, the top surface facing the access opening and movable to proximate the access opening, the platform including a notch sized to accept the upper platform stop, the platform rotatable to stop the platform against the upper platform stop proximate the access opening;

a flushing valve mounted on the platform and in fluid communication with the fluid system conduit, the flushing valve operatively connected to a flushing controller, the flushing valve controllable by the flushing controller; and a meter mounted on the top surface of the platform, the meter including a meter inlet and a meter outlet, the meter inlet in fluid communication with the flushing valve, the flushing valve in fluid communication with the meter and the fluid system conduit, the meter outlet in fluid communication with the discharge conduit.

15. A flushing device comprising:

an enclosure having an inner surface and an outer surface, the inner surface and the outer surface defining an access opening proximate an upper portion of the enclosure;

a platform within the enclosure, the platform having a top surface and a bottom surface, the top surface facing the access opening;

a flushing valve mounted on the platform; and a plurality of U-shaped rigid fluid routing support pipes mounted on the platform and in fluid communication with the flushing valve, the plurality of U-shaped rigid fluid routing support pipes accessible from the access opening, the platform movable proximate to the access opening by interaction with at least one of the U-shaped rigid fluid routing support pipes.

16. A flushing device comprising:

an enclosure having an inner surface and an outer surface, the inner surface and the outer surface defining an access opening proximate an upper portion of the enclosure;

a platform within the enclosure, the platform having a top surface and a bottom surface, the top surface facing the access opening;

a flushing valve mounted on the platform;

a U-shaped rigid fluid routing support pipe mounted on the platform and in fluid communication with the flushing valve, the U-shaped rigid fluid routing support pipe accessible from the access opening, the platform movable proximate to the access opening by interaction with the U-shaped rigid fluid routing support pipe;

a meter mounted on the top surface of the platform;

a backflow preventer mounted on the top surface of the platform, wherein the U-shaped rigid fluid routing support pipe connects the meter to the backflow preventer; and a dechlorinator mounted on the top surface of the platform.

17. The flushing device of claim 16, wherein the U-shaped rigid fluid routing support pipe connects the backflow preventer to the dechlorinator.

\* \* \* \* \*